US008026480B2

(12) United States Patent
Yamaguchi et al.

(10) Patent No.: US 8,026,480 B2
(45) Date of Patent: Sep. 27, 2011

(54) MASS SPECTROMETER

(75) Inventors: Shinichi Yamaguchi, Kyoto (JP); Masaru Nishiguchi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 162 days.

(21) Appl. No.: 12/600,375

(22) PCT Filed: May 22, 2007

(86) PCT No.: PCT/JP2007/000548

§ 371 (c)(1), (2), (4) Date: Nov. 16, 2009

(87) PCT Pub. No.: WO2008/142737

PCT Pub. Date: Nov. 27, 2008

(65) Prior Publication Data

US 2010/0148061 A1 Jun. 17, 2010

(51) Int. Cl.
*H01J 49/48* (2006.01)
*H01J 49/40* (2006.01)
*B01D 59/44* (2006.01)

(52) U.S. Cl. ..... 250/296; 250/294; 250/291; 250/396 R; 250/397; 250/281; 250/287

(58) Field of Classification Search .................. 250/296, 250/294, 291, 396 R, 397, 281, 287
See application file for complete search history.

(56) References Cited

U.S. PATENT DOCUMENTS 6,949,738 B2 9/2005 Yamaguchi et al.
7,355,168 B2 * 4/2008 Yamaguchi .................. 250/282
7,763,847 B2 * 7/2010 Nishiguchi et al. ........... 250/287
7,928,372 B2 * 4/2011 Yamaguchi et al. .......... 250/291
2004/0056190 A1 3/2004 Buttrill, Jr.
2010/0140469 A1 * 6/2010 Nishiguchi .................. 250/287

FOREIGN PATENT DOCUMENTS

JP 11-297267 A 10/1999
JP 2005-149869 A 6/2005
JP 2006-500751 A 1/2006
JP 2006-294451 A 10/2006

(Continued)

OTHER PUBLICATIONS

Hisashi Matsuda, "Improvement of a TOF Mass Spectrometer with Helical Ion Trajectory", Journal of Mass Spectrometry Society of Japan, 2001, pp. 227-228, vol. 49, No. 6.

(Continued)

*Primary Examiner* — Nikita Wells
(74) *Attorney, Agent, or Firm* — Sughrue Mion, PLLC

(57) ABSTRACT

A basic ion optical system (2) in which the temporal focusing of ions is ensured includes a plurality of sector-shaped electrodes (11, 12, 13, and 14), an ion injection slit (15), and an ion ejection slit (16), which are placed on the same plane. A plurality of basic ion optical systems (2) are placed in such a manner as to be mutually separated at predetermined intervals in the direction approximately orthogonal to their planes. The ion ejection slit (16) of the lower-stage basic ion optical system (2) and the ion injection slit (15) of the next-stage basic ion optical system (2) are connected to each other via another basic ion optical system (3) in which the temporal focusing of the ions is ensured. Accordingly, the flight distance can be elongated while assuredly achieving the temporal focusing of the ions as an entire ion optical system (1), and a three-dimensional space can be efficiently utilized to compactify the ion optical system (1).

6 Claims, 3 Drawing Sheets

FOREIGN PATENT DOCUMENTS

WO 2004/030008 A3 4/2004

OTHER PUBLICATIONS

Hisashi Matsuda, "Spiral Orbit Time of Flight Mass Spectrometer", Journal of Mass Spectrometry Society of Japan, 2000, pp. 303-305, vol. 48, No. 5.

Takaya Satoh, et al., "A New Spiral Time-of-Flight Mass Spectrometer for High Mass Analysis" Journal of Mass Spectrometry Society of Japan, 2006, pp. 11-17, vol. 54, No. 1.

T. Sakurai, et al., "Ion Optics for Time-of-Flight Mass Spectrometers with Multiple Symmetry", Journal of Mass Spectrom. and Ion Processes, 1985, pp. 273-287, vol. 63.

* cited by examiner

MASS SPECTROMETER

TECHNICAL FIELD

The present invention relates to a time-of-flight mass spectrometer (TOF-MS). More specifically, it relates to an ion optical system for forming a flight space in which ions are made to fly in a time-of-flight mass spectrometer.

BACKGROUND ART

In a time-of-flight mass spectrometer, the mass of an ion is generally calculated from the time of flight which is obtained by measuring a period of time required for the ion to fly over a fixed distance, on the basis of the fact that an ion accelerated by a fixed energy has a flight speed corresponding to the mass of the ion. Accordingly, elongating the flight distance is particularly effective to enhance the mass resolution. However, elongation of a flight distance simply on a straight line requires unavoidable enlargement of the device, which is not practical, so that a variety of ion optical systems for forming an ion flight space have been developed.

One known type of such an ion optical system is a multi-turn optical system in which a plurality of sector-shaped electric fields are used to form a closed orbit such as a substantially elliptical orbit, substantially "8" figured orbit, etc (refer to Patent Document 1 and other documents, for example). Ions are made to fly along such a loop orbit repeatedly multiple times to elongate the flight distance.

In this type of multi-turn time-of-flight mass spectrometer, it is necessary to prevent a decrease in the sensitivity and resolution due to temporal and spatial expansion of ions having the same mass-to-charge ratio during their flight along the orbit. Therefore, in designing the ion optical system to form a loop orbit, it is required that the time-of-flight peak should not be broadened and the ion beam should not be diverged after the flight, in addition to the requirement that the orbit should be geometrically and structurally closed. In the explanations below, an ion optical system for foaming a loop orbit will be simply called an ion optical system.

To meet such demands, in the multi-turn time-of-flight mass spectrometer described in Patent Document 1, for example, it is required as a time-focusing condition that the time of flight of the ions after the flight through the loop orbit is not dependent on an initial position, initial angle, and initial energy of the ions at the moment when they start to fly. Such conditions limit the shape and arrangement of sector-shaped electric fields to configure the ion optical system, and therefore the design of the ion optical system is not always easy.

Increasing the number of turns on the loop orbit enhances the mass resolution. However, in the case where ions having different masses are mixed, ions having a smaller mass and flying faster catch and pass ions having a larger mass and flying more slowly, which makes it difficult to distinguish the ions. Given this factor, in order to enhance the mass resolution, it is desirable to elongate the distance of one cycle of the loop orbit as much as possible so that ions do not catch and pass ions having different masses. The elongation of the distance of one cycle requires an increase in the number of sector-shaped electric fields which compose the ion optical system, an increase of their curvature, and an elongation of the length of free flight spaces. In the end, this requires an enlargement of the installation area of the ion optical system.

One method for preventing ions from catching and passing other ions on the loop orbit, and moreover, for suppressing the installation area is to form a helical flight orbit. In the apparatuses described in Non-Patent Documents 1 through 3, for example, a loop orbit which is stable on a plane and capable of focusing a variety of spreads (or dispersions) that ions have is slightly deflected in the direction perpendicular to the plane to form a helical orbit. With such a configuration, even if the focusing (particularly time-focusing) condition of ions is satisfied with regard to the loop orbit on plane, the focusing condition of ions with regard to the entire helical orbit is not assured. In particular, an increase in the number of turns to elongate the flight distance might pose a problem in that some ions disperse to decrease the sensitivity or the mass accuracy and mass resolution are not increased as much as expected.

[Patent Document 1] Japanese Unexamined Patent Application Publication No. H11-297267

[Non-Patent Document 1] H. Matsuda, "Improvement of a TOF Mass Spectrometer with Helical Ion Trajectory," *Journal of Spectrometry Society of Japan,* 49, pp. 227-228 (2001)

[Non-Patent Document 2] H. Matsuda, "Spiral Orbit Time of Flight Mass Spectrometer," *Journal of Spectrometry Society of Japan,* 48, pp. 303-305 (2000)

[Non-Patent Document 3] T. Satoh and three other authors, "A New Spiral Time-of-Flight Mass Spectrometer for High Mass Analysis," *Journal of Spectrometry Society of Japan,* 54, pp. 11-17 (2006)

DISCLOSURE OF THE INVENTION

Problems to be Solved by the Invention

The present invention has been accomplished in view of the previously described problems and the main objective thereof is to provide a mass spectrometer having a time-of-flight ion optical system which is easy to design, compact in size, and ensuring a long flight distance to achieve high levels of mass accuracy and mass resolution.

Means for Solving the Problems

To solve the previously described problems, the present invention provides a time-of-flight mass spectrometer in which a predetermined energy is given to ions to make the ions fly in a flight space to temporally separate the ions in accordance with their mass and detect the ions with an ion detector, the mass spectrometer including:

a plurality of basic ion optical systems in each of which an ion inlet, an ion outlet, and a flight orbit are provided on a plane, the flight orbit being formed by electric fields including a plurality of sector-shaped electric fields so that ions injected from the ion inlet satisfy a time-focusing condition at the ion outlet, wherein:

the plurality of basic ion optical systems are tandemly connected in such a manner that the ion outlet of one basic ion optical system is connected to the ion inlet of a subsequent basic ion optical system, and the plurality of basic ion optical systems are placed on mutually different planes.

The state where the time-focusing condition is satisfied can be defined as the state where the time of flight of ions is not dependent on an initial position, initial angle (direction), and initial energy of the ions. In other words, even if ions are dispersed in terms of these factors, their time of flight will be equalized if they have the same mass (or mass-to-charge ratio, to be exact).

That is, in the mass spectrometer according to the present invention, the flight distance is elongated by aligning a plurality of basic ion optical systems, in each of which the temporal focusing in terms of at least the dispersion of the velocity, angle, and energy of the ions having the same mass and being injected from the ion inlet is achieved at the ion outlet. The plurality of basic ion optical systems can be appropriately arranged to form a three-dimensional structure that neither requires a large installation area nor occupies a large three-dimensional space.

As an embodiment of the mass spectrometer according to the present invention, the basic ion optical system may include:

the first ion optical system in which the direction of the injection of an ion at the ion inlet and the direction of the ejection of an ion at the ion outlet are the same; and the second ion optical system in which the direction of the injection of an ion at the ion inlet and the direction of the ejection of an ion at the ion outlet are opposite, a plurality of the first ion optical systems are arranged in such a manner that the planes on each of which the first ion optical system is placed are parallel to each other and mutually separated in the direction orthogonal or oblique to the planes, and the ion inlet of one of adjacent first basic ion optical systems and the ion outlet of the other one of the adjacent first basic ion optical systems are connected through the second basic ion optical system.

With such a configuration, a plurality of first basic ion optical systems can be stacked in such a manner that they are separated from each other at predetermined intervals in the direction approximately orthogonal to the planes on which these optical systems are placed. This configuration efficiently uses the three-dimensional space, so that the flight distance can be elongated while the entire system is maintained in a small size.

Concrete embodiments of the mass spectrometer according to the present invention include a non-loop orbit in which an ion does not pass the same orbit, and a loop orbit in which an ion can repeatedly fly along the same orbit. In the former case, the plurality of tandemly connected basic ion optical systems can be constructed so that an ion is injected from outside into the ion inlet of the first-stage basic ion optical system, and the ion is ejected from the ion outlet of the last-stage basic ion optical system and then detected. In the latter case, the plurality of tandemly connected basic ion optical systems can be constructed so that the ion inlet of the first-stage basic ion optical system and the ion outlet of the last-stage basic ion optical system are connected.

In the case of a loop orbit, since ions are required to be injected to the orbit from outside and ejected from the orbit, an additional configuration for injecting and ejecting ions is needed. For example, such a configuration can be obtained by providing deflection electrodes for injecting ions into and ejecting ions from the orbit and forming openings in the sector-shaped electrodes for forming sector-shaped electric fields in order to inject and eject ions.

Effects of the Invention

With the mass spectrometer according to the present invention, it is possible to form a flight orbit that is adequately small for a compact space and yet capable of satisfying the time-focusing condition of ions and ensuring a long fight distance, for both loop and non-loop orbits. This improves the mass accuracy and mass resolution, and enables an easy downsizing of the apparatus. The design of the ion optical axis only requires that the size, shape, arrangement and other factors of the electrodes that compose the sector-shaped electric fields be chosen so that the focusing of the ions can be achieved on a plane. Therefore, the design is relatively flexible and the designing work is easy.

EXPLANATION OF NUMERALS

P1, P2, P3 . . . Basic Ion Optical System Plane
11, 12, 13, 14 ,21, 22, 23 ,24, 25, 26 . . . Toroidal Sector-Shaped Electrode
15 . . . Ion Injection Slit
16 . . . Ion Ejection Slit
A . . . Non-Loop Orbit
B . . . Loop Orbit

BEST MODE FOR CARRYING OUT THE INVENTION

Figure 1:
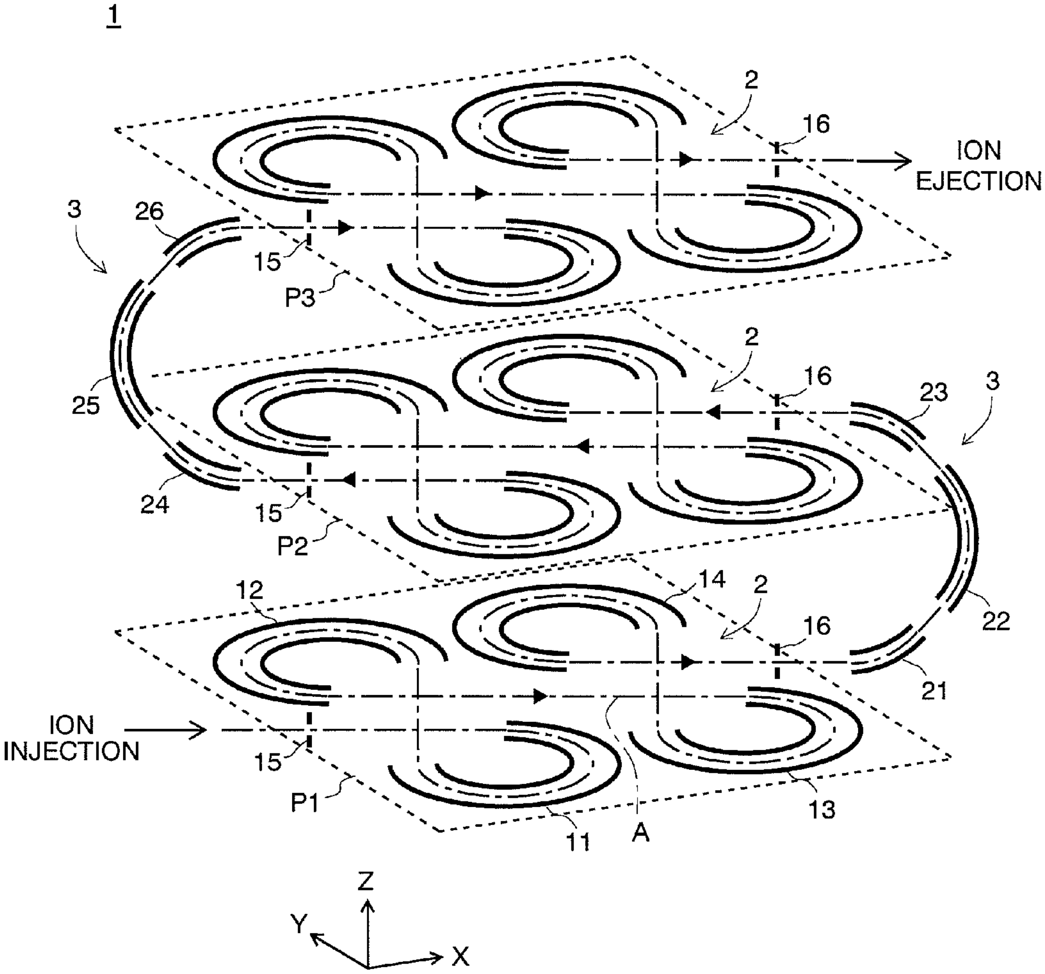
FIG. 1 is a schematic perspective view of an ion optical system of the time-of-flight mass spectrometer according to an embodiment of the present invention.
Figure 3:
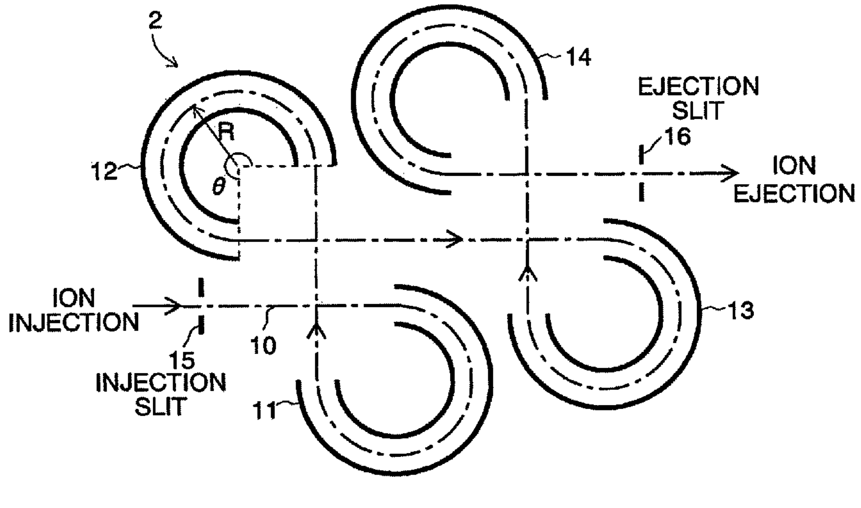
FIG. 3 is a plain view illustrating an example of a conventional non-loop-type ion optical system.
Figure 4:
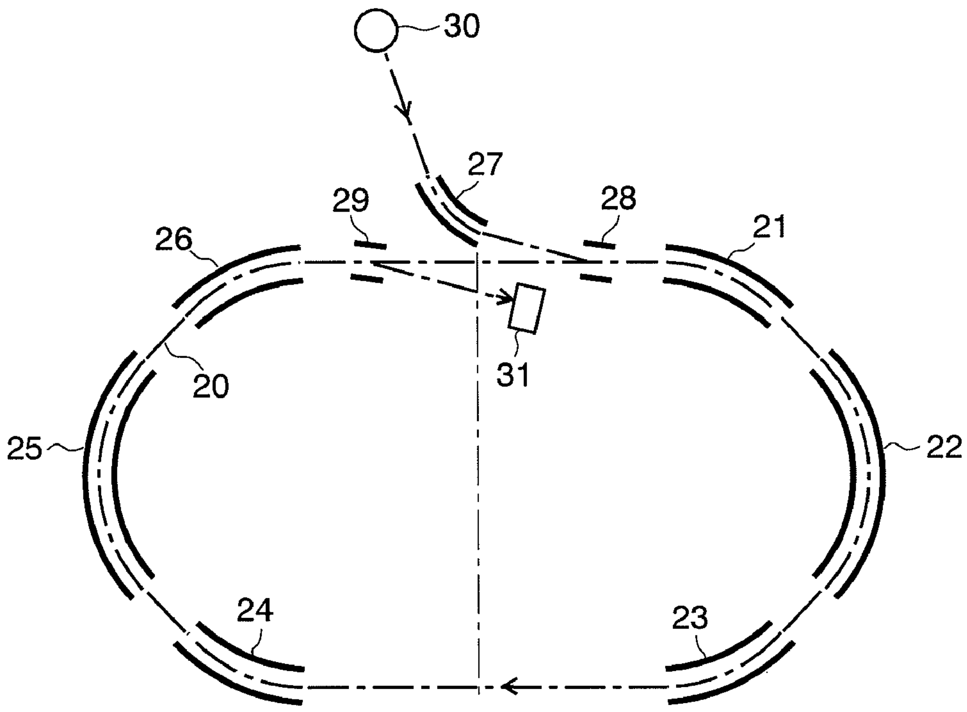
FIG. 4 is a plain view illustrating an example of a conventional loop-type ion optical system.

A time-of-flight mass spectrometer which is an embodiment of the present invention will be described with reference to FIGS. 1, 3, and 4. FIG. 1 is a schematic perspective view of an ion optical system 1 for making ions fly to mass separate them in this mass spectrometer. FIGS. 3 and 4 are plain views of non-loop-type and loop-type ion optical systems, respectively.

In the ion optical system 1 in the mass spectrometer of the present embodiment, three basic ion optical system planes P1, P2, and P3 on x-axis—y-axis planes, on each of which the first basic ion optical system 2 is formed, are placed in such a manner as to be mutually separated in the z-axis direction. In addition, the orbits on the basic ion optical system planes P1 and P2, and those on the basic ion optical system planes P2 and P3, which are adjacent in the z-axis direction, are connected with each other via a second basic ion optical system 3.

The first basic ion optical system 2 is an example described in some documents, such as: T. Sakurai and two other authors, "Ion Optics for Time-of-Flight Mass Spectrometers with Multiple Symmetry," *Journal of Spectrom. and Ion Process,* 63, pp. 273-287 (1985). As illustrated in FIG. 3, it includes: four pairs of toroidal sector-shaped electrodes 11, 12, 13, and 14; an ion injection slit 15; and an ion ejection slit 16. Each of the toroidal sector-shaped electrodes 11, 12, 13, and 14 is composed of an outer electrode paired with an inner electrode. The slit opening of the ion injection slit 15 corresponds to the ion inlet of the present invention, and the slit opening of the ion ejection slit 16 corresponds to the ion outlet of the present invention. The direction of the injection of ions through the ion injection slit 15 and the direction of the ejection of ions through the ion ejection slit 16 are identical (i.e. to the right in FIG. 3). The components and their arrangement of the first basic ion optical system 2 are each designed so that ions are temporally focused at the ion ejection slit 16 in terms of the dispersion of the velocity, angle, and energy that the ions have at the ion injection slit 15. That is, ions having the same mass have the same time of fight.

The second basic ion optical system 3 utilizes a half cycle of the loop orbit disclosed in Patent Document 1 and other documents. In the apparatus described in Patent Document 1, as illustrated in FIG. 4, six pieces of toroidal sector-shaped electric fields 21, 22, 23, 24, 25, 26, each consisting of an outer electrode paired with an inner electrode, form an approximately elliptical loop orbit. Ions ejected from an ion source 30 pass through a deflection electrode 27 and an injection electrode 28 to be injected into a loop orbit C. Ions flying along the loop orbit C are deviated from the orbit by an ejection electrode 29 to reach an ion detector 31. In this configuration, the temporal focusing of the ions is achieved in exactly one half cycle, i.e. through one half of the loop orbit including three pieces of toroidal sector-shaped electric fields 21, 22, and 23, or three pieces of toroidal sector-shaped electric fields 24, 25, and 26. In the mass spectrometer of the present embodiment, each set of the three pieces of toroidal sector-shaped electric fields is used as the second basic ion optical system 3.

To each toroidal sector-shaped electrode, a predetermined direct-current voltage is applied between the outer and inner electrodes from a power supply, which is not shown, to form a sector-shaped electric field in the space therebetween.

As previously described, the temporal focusing of the ions are ensured in both the first basic ion optical system 2 and the second basic ion optical system 3. Therefore, even in the case illustrated in FIG. 1, where a plurality (five in the example of FIG. 1) of the ion optical systems are dependently connected to form a non-loop flight orbit A, ions injected from the ion injection slit 15 of the first-stage first basic ion optical system 2 on the basic ion optical system plane P1 are assuredly time-focused at the ion ejection slit 16 of the last-stage first basic ion optical system 2 on the third basic ion optical system plane P3. Accordingly, while the flight distance is elongated to increase the mass resolution, a high passage ratio of ions is also achieved to ensure sufficient detection sensitivity.

In addition, stacking the first basic ion optical system planes in the z-axis direction utilizes the space in the vertical direction to compactify the ion optical system 1. Generally, a mass spectrometer tends to require a large installation area because the ion optical elements are often two-dimensionally placed. On the other hand, the aforementioned configuration can keep the installation area small, and thereby enables the creation of mass spectrometers more compact than ever before.

Figure 2:
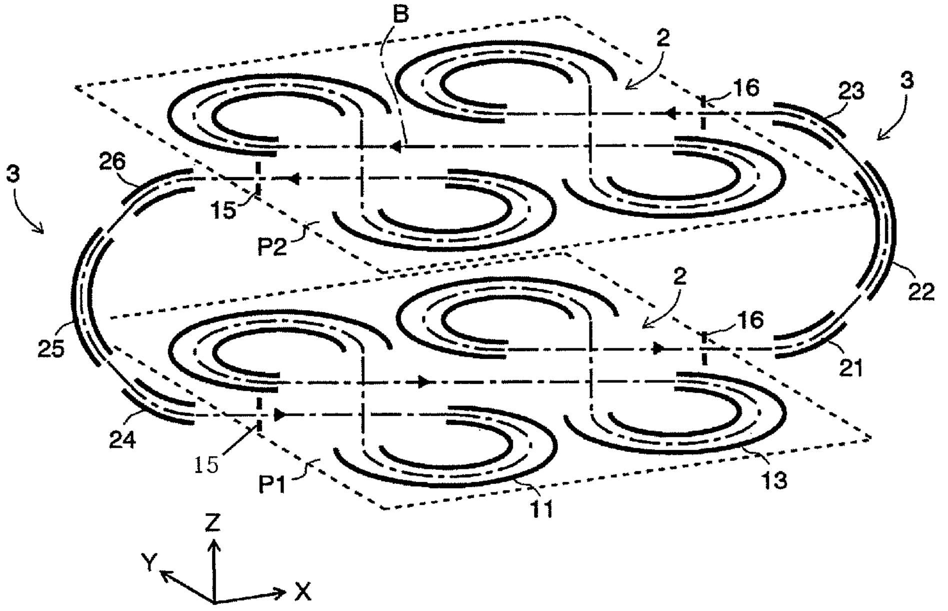
FIG. 2 is a schematic perspective view of an ion optical system of the time-of-flight mass spectrometer according to another embodiment of the present invention.

Next, a time-of-flight mass spectrometer of another embodiment of the present invention will be described with reference to FIG. 2. FIG. 2 is a schematic perspective view of an ion optical system 1 for making ions fly to mass separate them in this mass spectrometer. In the previous embodiment, the first basic ion optical systems 2 and the second basic ion optical systems 3 are tandemly connected to form a non-loop flight orbit. In this embodiment, a loop flight orbit B is formed using the same first basic ion optical systems 2 and the second basic ion optical systems 3. That is, considering the ion injection slit 15 on the basic ion optical system plane P1 to be the starting point, the outlet of the second basic ion optical system 3 which is connected to the ion ejection slit 15 on the second-stage first basic ion optical system plane P2 is connected to the ion injection slit 15 on the basic ion optical system plane Pl, forming a loop flight orbit B in which ions are assuredly focused in terms of time.

The flight orbit B is closed. In order to inject ions into the orbit B or eject ions flying along the orbit B, any conventionally known method of injecting and ejecting ions can be adopted. Such methods include, for example: additionally providing a deflection electrode as illustrated in FIG. 4; and providing an opening on any one of the toroidal sector-shaped electrodes to inject or eject ions while a voltage is not applied to the sector-shaped electrode.

It should be noted that the embodiments described thus far are merely an example of the present invention, and it is evident that any modification, adjustment, or addition made within the sprit of the present invention is also included in the scope of the claims of the present application. For example, any of the basic ion optical systems adopted in the previous embodiments is an example, and can be appropriately configured. Furthermore, the plural basic ion optical planes does not need to be arranged in parallel to each other: they may be obliquely or orthogonally arranged, unless they are on the same plane.

The invention claimed is:

1. A time-of-flight mass spectrometer in which a predetermined energy is given to ions to make the ions fly in a flight space to temporally separate the ions in accordance with their mass and detect the ions with an ion detector, the mass spectrometer comprising:

a plurality of basic ion optical systems in each of which an ion inlet, an ion outlet, and a flight orbit are provided on a plane, the flight orbit being formed by electric fields including a plurality of sector-shaped electric fields being so that ions injected from the ion inlet satisfy a time-focusing condition at the ion outlet, wherein:

the plurality of basic ion optical systems are tandemly connected in such a manner that the ion outlet of one basic ion optical system is connected to the ion inlet of a subsequent basic ion optical system, and the plurality of basic ion optical systems are placed on mutually-different planes.

2. The mass spectrometer according to claim 1, wherein:

the basic ion optical system includes:

a first ion optical system in which a direction of an injection of an ion at the ion inlet and a direction of an ejection of an ion at the ion outlet are the same; and a second ion optical system in which a direction of an injection of an ion at the ion inlet and a direction of an ejection of an ion at the ion outlet are opposite, a plurality of the first ion optical systems are arranged in such a manner that the planes on each of which the first ion optical system is placed are parallel to each other and mutually separated in a direction orthogonal or oblique to the planes, and the ion inlet of one of adjacent first basic ion optical systems and the ion outlet of an other one of the adjacent first basic ion optical systems are connected through the second basic ion optical system.

3. The mass spectrometer according to claim 2, wherein the plurality of tandemly connected basic ion optical systems form a non-loop orbit in which an ion is injected from outside into the ion inlet of a first-stage basic ion optical system, and the ion is ejected from the ion outlet of a last-stage basic ion optical system and then detected.

4. The mass spectrometer according to claim 2, wherein the plurality of tandemly connected basic ion optical systems form a loop orbit in which the ion inlet of a first-stage basic ion optical system and the ion outlet of a last-stage basic ion optical system are connected.

5. The mass spectrometer according to claim 1, wherein the plurality of tandemly connected basic ion optical systems form a non-loop orbit in which an ion is injected from outside into the ion inlet of a first-stage basic ion optical system, and the ion is ejected from the ion outlet of a last-stage basic ion optical system and then detected.

6. The mass spectrometer according to either claim 1, wherein the plurality of tandemly connected basic ion optical systems form a loop orbit in which the ion inlet of a first-stage basic ion optical system and the ion outlet of a last-stage basic ion optical system are connected.

* * * * *